United States Patent [19]
Sanderford, Jr.

[11] Patent Number: 5,742,635
[45] Date of Patent: Apr. 21, 1998

[54] ENHANCED TIME OF ARRIVAL METHOD

[75] Inventor: H. Britton Sanderford, Jr., New Orleans, La.

[73] Assignee: Sanconix, Inc., New Orleans, La.

[21] Appl. No.: 238,326

[22] Filed: May 5, 1994

[51] Int. Cl.$^6$ .................. H04B 15/00; G01S 3/02
[52] U.S. Cl. ............ 375/200; 342/450; 342/463
[58] Field of Search ............ 375/200; 342/450, 342/463

[56] References Cited

U.S. PATENT DOCUMENTS

| | | | |
|---|---|---|---|
| 3,969,725 | 7/1976 | Couvillon et al. | 343/6.5 |
| 4,166,275 | 8/1979 | Michaels et al. | 343/103 |
| 4,357,610 | 11/1982 | Kingston et al. | 343/12 |
| 4,455,556 | 6/1984 | Koshio et al. | 343/7.3 |
| 4,520,445 | 5/1985 | Keearns | 364/450 |
| 4,558,418 | 12/1985 | Keearns | 364/450 |
| 4,644,560 | 2/1987 | Torre et al. | 375/1 |
| 4,758,839 | 7/1988 | Goebel et al. | 342/132 |
| 4,972,431 | 11/1990 | Keegan | 375/1 |
| 4,972,441 | 11/1990 | Roberts et al. | 375/95 |
| 5,017,930 | 5/1991 | Stoltz et al. | 342/465 |
| 5,093,841 | 3/1992 | Vancraeynest | 375/1 |
| 5,119,104 | 6/1992 | Heller | 342/450 |
| 5,148,452 | 9/1992 | Kennedy et al. | 375/96 |
| 5,179,573 | 1/1993 | Paradise | 375/1 |
| 5,266,953 | 11/1993 | Kelly et al. | 342/47 |

OTHER PUBLICATIONS

Enge, Per K., *Bandwidth Selection for Urban Radionavigation Systems* Worcester Polytechnic Institute, Mar. 25, 1988.
Enge, Per K., *Bandwidth Selection for Urban Radionavigation System (Addendum)*, Worcester Polytechnic Institution, Jul. 29, 1988.

*Primary Examiner*—David C. Cain
*Attorney, Agent, or Firm*—Oblon, Spivak, McClelland, Maier & Neustadt, P.C.

[57] ABSTRACT

A method for improving a radio location system based on time-of-arrival. Time-of-arrival radio location systems are limited in ultimate accuracy by signal-to-noise ratio and by the time varying multipath environment in which they must operate. These systems time stamp some feature of an arriving signal, from a transmitter, in order to calculate a range or a hyperbolic line-of-position. Some feature of the received signal must be identified which can provide repeatable readings, in order for a time-of-arrival system to be reliable. The present invention teaches techniques which maintain a high signal-to-noise ratio while identifying a feature of the received signal which is least affected by multipath. The technique uses correlation peak/envelope information to estimate the leading edge of the correlation function, then enhances discrete samples at the leading edge of the correlation function to yield high signal-to-noise ratio readings. The present invention can reduce required transmitted bandwidth, increase system resolution and accuracy by twenty to one, and maintain high message traffic throughput.

41 Claims, 5 Drawing Sheets

FIG. 3

FIRST READING SHOULD ESTABLISH AMBIENT NOISE FLOOR. (301)

SECOND READING (dB) (302)

|   | 0 | 1 | 2 | 3 | 4 | 5 | 6 |
|---|---|---|---|---|---|---|---|
| 0 |   |   |   |   |   |   |   |
| 1 |   |   |   |   |   |   |   |
| 2 |   |   |   |   |   |   |   |
| 3 |   |   |   |   |   |   |   |
| 4 |   |   |   |   |   |   |   |
| 5 |   |   |   |   |   |   |   |
| 6 |   |   |   |   |   |   |   |
| 7 |   |   |   |   |   |   |   |
| 8 |   |   |   |   |   |   |   |
| 9 |   |   |   |   |   |   |   |
| 10 |   |   |   |   |   |   |   |

THIRD READING (dB) (303)

LOOK UP EMPIRICAL DATA TO YIELD MOST ACCURATE RESULT. (304)

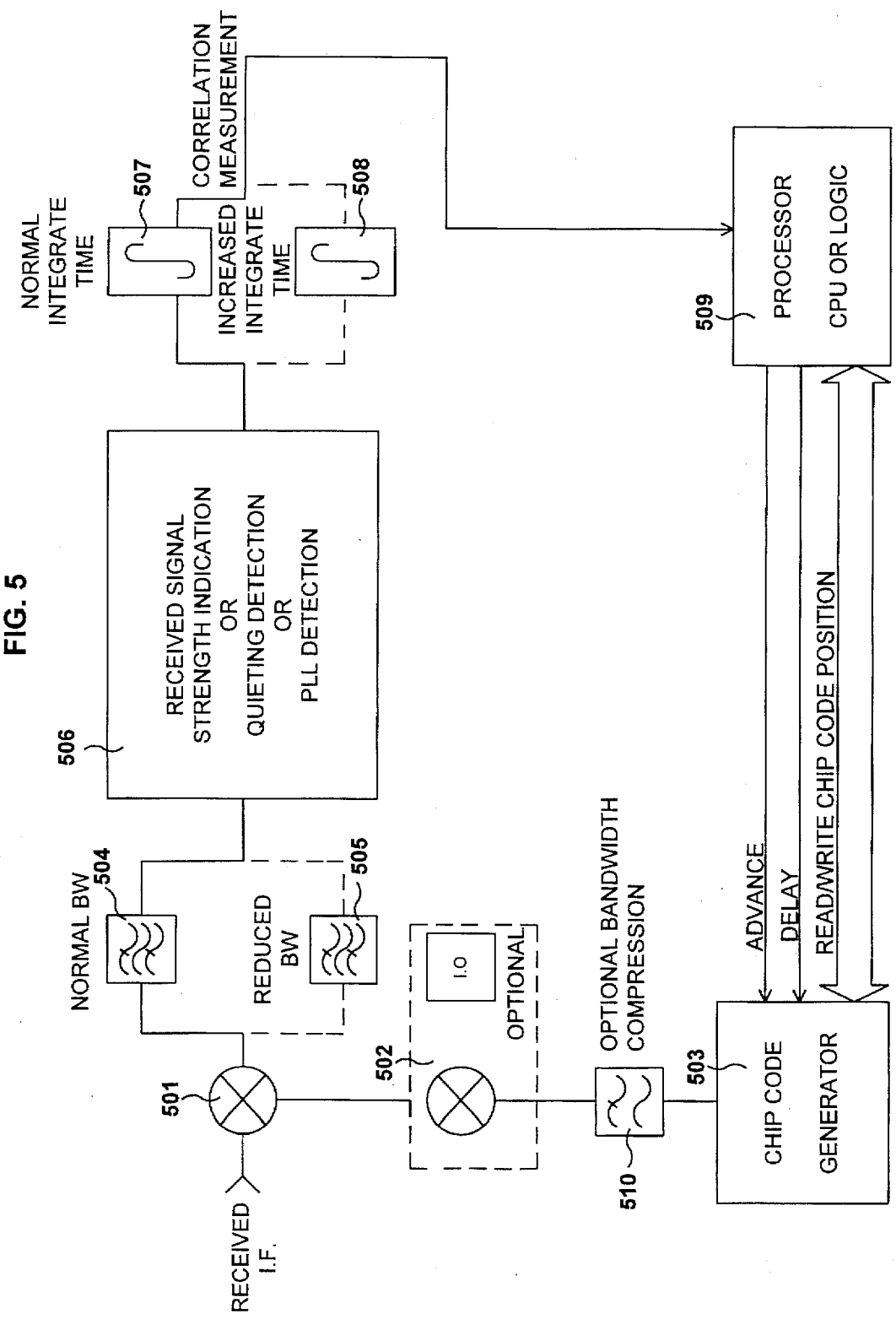

ENHANCED TIME OF ARRIVAL METHOD

BACKGROUND OF THE INVENTION

This invention relates to radio location systems and more particularly to an improved time of arrival method using spread-spectrum modulation.

DESCRIPTION OF THE RELEVANT ART

The literature describes numerous radio location systems which are based on time-of-arrival information. These systems are primarily concerned with identifying a correlation peak and tracking that peak. The correlation peak is time stamped to provide a radio ranging, round trip distance measurement. Alternatively, two or more receivers can be used to calculate a hyperbolic line-of-position. Additional time-of-arrival approaches using direct sequence spread spectrum in the prior art include a method for separating one satellite signal from other satellite signals through correlation of a locally generated precise-code sequence with encrypted precise-code signals, the use of clock recovery circuitry to cycle through M phases of a locally generated receiver clock to select the phase yielding the strongest signal, and the use of a digital correlator to determine the time of arrival of a received pseudonoise sequence. Pulsed techniques capable, after compensating for pulse time detection errors, of adjusting estimated time-of-arrival as a function of the measured pulse slope are also known in the prior art. Such systems operate in the presence of background noise and multipath reflections created by objects in the proximity of the receiver and transmitter. The multipath reflections cause errors in the time stamped reading generated by such time-of-arrival systems. Existing prior art systems do not teach the determination of a correlation peak for estimating the leading edge, or the taking of additional samples at the leading edge to improve the accuracy of the time-of-arrival stamp.

A long time goal in the prior art has been to reduce the effects of multipath on time-of-arrival systems. A typical solution is to use a narrower chip time which, in its familiar radar equivalent, relates to wider bandwidth. The wider bandwidth yields a finer feature in the received signal in order to increase accuracy and resolution of the time-of-arrival measurement. Also, the more narrow chip time signal is less affected by later arriving multipath reflections. The wider bandwidth systems, however, make trade-offs which are detrimental to the ultimate performance and/or viability of the system. As the correlation function becomes narrower, only a portion of the total received energy can be utilized. This is due to the received signals following a delay spread echo envelope pattern which may last one to five microseconds. If a correlation function were used on the order of 100 nanoseconds, then undesirable multipath echoes as well as the majority of the received signal is rejected in an amount proportional to the process gain of the system. This reduces the effective signal-to-noise ratio (SNR) of the system. Complex, multiple peak, rake detectors have been developed to reduce this effect on systems which are primarily intended for data reception. In a system which is primarily intended for radio location, however, the leading edge information typically is more important than subsequent information, for producing an accurate time stamp.

An additional disadvantage of narrow chip times is the resulting increased bandwidth. Commercial time-of-arrival radio systems must operate under Federal Communications Commission (FCC) regulations and guidelines. Systems using a great amount of bandwidth suffer a competitive disadvantage when placed against time-of-arrival, radio location systems which can successfully use reduced bandwidth and achieve similar accuracies. In addition to the regulatory limitations placed by the FCC, the hardware implementation of very wide bandwidth systems presents additional problems. Such systems require receivers which have front-ends which are purposely wide enough to receive the entire incoming signal. Such front-ends are difficult and expensive to design with the desirable filter roll-off characteristics needed to defend such receivers from out-of-band interference. This can lead to intermodulation distortion and loss of desired signal. In addition, the wider the front-end bandwidth becomes, the easier it is to receive unintentional, fundamental or harmonic interference within the front-end pass-band. This also reduces effective signal-to-noise ratio and measurement accuracy, and leads to the loss of intended signals.

In order for a radio location system to produce the most accurate time-of-arrival measurement, the radio location system identifies a repeatable feature in the received signal which is least affected by multipath. Multipath reflections travel a greater distance than a direct arriving signal. Since multiple signals take a longer time to arrive at a receiver's sight, the leading edge radio energy should be used in order to time stamp the time-of-arrival of a received signal. Prior art techniques relying on leading edge detection include the use of zero crossing detection of the carrier wave for improving the accuracy of a time-of-flight time stamp; pulsed, radar-type systems for measuring distance between an interrogator and a transponder based on leading edges of an interrogation pulse and a reply pulse, and for estimating a leading edge for a navigation system; and the use of leading edge as well as late arriving signal information collected from a plurality of individual detectors in a radar altimeter context. The prior art in the area of leading edge detection also includes methods for reducing multipath errors through the use of Kalman filters, and time-of-arrival trigger circuits responsive to the arrival of a direct path time-of-flight transmission. These prior art references do not teach the use of direct sequence spread spectrum for finding a correlation peak, requiring only one detector, and the subsequent use of the correlation peak for estimating the leading edge of the correlation function.

The leading edge of the received signal is least affected by multipath error. Unfortunately, the leading edge typically is not the highest signal-to-noise ratio portion of the signal. The literature teaches a number of methods which can be employed to optimize signal-to-noise ratio, including tau dither loops, delay lock loops, Costas loops, and the methods disclosed in U.S. Pat. No. 4,977,577. Although such methods optimize signal-to-noise ratio, they generally do not track the leading edge of the received signal since the leading edge does not represent optimal signal-to-noise ratio.

In the case of a weak received signal, the leading edge of the correlation function may be well below a minimum detectable signal level, whereas the corresponding correlation function peak could be adequate for decoding data alone. In addition to inability to detect the leading edge least affected by multipath, conventional tau dither loops, time delay lock loops, Costas loops, etc. produce a large amount of jitter when the received signal is weak. This jitter results in inaccurate time-of-arrival measurements.

SUMMARY OF THE INVENTION

A general object of the invention is using the least amount of bandwidth possible to yield accurate time-of-arrival readings.

Another object of the invention is enhanced accuracy time-of-arrival readings with minimal transmitted message dwell time to allow the greatest number of simultaneous users on a radio location system.

An additional object of the invention is identifying and measuring a feature in a received signal which is least affected by multipath errors.

A further object of the invention is obtaining accurate time-of-arrival readings with low signal-to-noise ratio, minimum detectable signals.

A still further object of the invention is to provide enhanced time-of-arrival readings with resolution greater than the sub-chip step size searched.

According to the present invention, as embodied and broadly described herein, an enhanced time of arrival method for use with a radio location system is provided. A receiver uses direct sequence spread-spectrum modulation to time stamp a received radio broadcast. The receiver receives a spread-spectrum modulated signal from a transmitter. The steps include determining, in the received spread-spectrum signal, a time position of a correlation peak and estimating, from the correlation peak, a leading edge of a correlation function. The steps further include moving a receiver chip code position, corresponding to the estimated leading edge of the correlation function, backward by about one chip time, relative to the chips in the received spread-spectrum signal. The receiver-chip-code position, relative to the chips in the received spread spectrum signal, is then moved forward by sub-chip increments until a correlation envelope reading exceeds a preset margin. The method uses the leading edge of the correlation function, as determined by the receiver-chip-code position when the correlation envelope reading exceeds the preset margin, to time stamp an arriving signal. The term "receiver-chip-code position" as used herein is the position of chips in a chip sequence generated at the receiver. The receiver chip sequence is used to despread the received spread-spectrum signal, as is well known in the art.

The method, as broadly embodied herein, further includes comparing the leading edge to a level equaling a sum of an auto-correlation code noise and estimated background noise, and using the leading edge to time stamp the arriving signal only when the leading edge exceeds the sum. Signal-to-noise ratio may be enhanced by reducing the bandwidth of the receiver following estimation of the leading edge. Alternatively, signal-to-noise ratio may be enhanced by increasing the integration time.

The method may also include taking a multiplicity of correlation envelope samples of the leading edge of the correlation function, each of the samples being separated by a portion of a chip time. The method then includes deriving slope information from this multiplicity of samples for enhancing the resolution of the time-of-arrival time stamp. The method may also include inputting the multiplicity of correlation envelope samples to a look-up table of best-fit results for increasing the resolution of the time-of-arrival time stamp.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention and, together with the description, serve to explain the principles of the invention.

FIG. 3 is a look-up table of signal increase over ambient noise vs. sub-chip position signal strength;

FIG. 5 is a receiver block diagram.

DETAILED DESCRIPTION OF THE PREFERRED EMBODIMENTS

Figure 1:
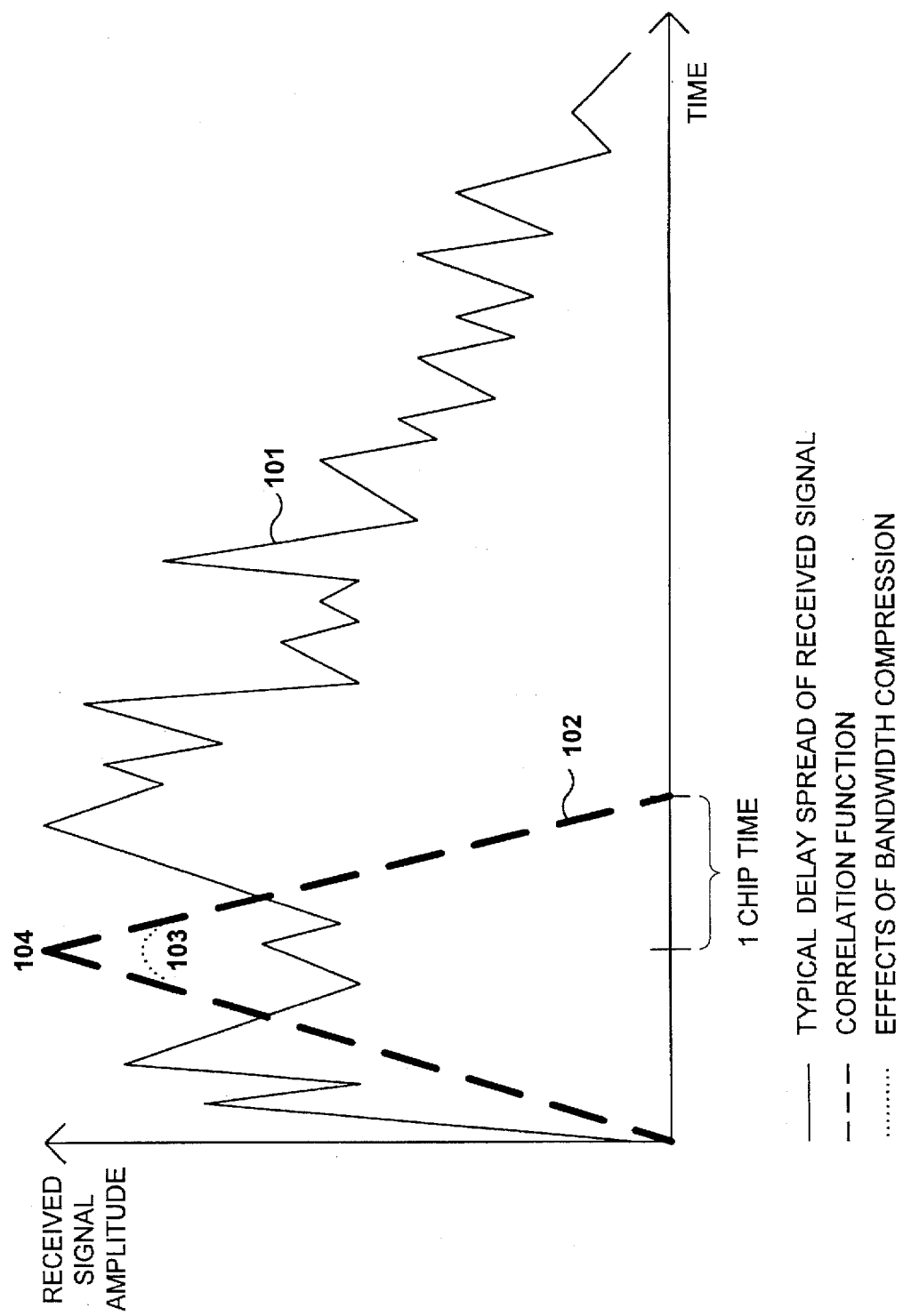
FIG. 1 illustrates delay spread effect on correlation function.

Reference now is made in detail to the present preferred embodiments of the invention, examples of which are illustrated in the accompanying drawings, wherein like reference numerals indicate like elements throughout the several views.

As illustratively shown in FIG. 1, when a radio wave is transmitted, regardless of modulation or bandwidth, the radio wave propagates through a multiplicity of physical paths prior to being collected at a receiving antenna. The multipaths reverberate through a building or echo through a city and produce a delay spread profile. Information from this delay spread profile 101 is used to time stamp a feature of the incoming signal in order to provide a time-of-arrival measurement, or relative time-of-arrival measurement. In a direct sequence radio modulated system, the received correlation signal takes on the function as shown by the dashed lines 102. This function would typically provide a sharp, well-defined correlation peak 104 in the absence of multipath effects. In the presence of severe multipath, however, the well-defined correlation peak can often be lost. The correlation function could indeed have two or more peaks. Further, in bandwidth compressed systems, the correlation function does not yield a well defined correlation peak but rather a rounded-off top 103 with no distinct peak to time stamp. Such bandwidth compressed correlation functions previously reduced resolution in time-of-arrival readings. The instant invention, however, uses the correlation function leading edge which can still provide accurate readings.

The receiver first steps a chip code generator by a portion of a chip time or a whole chip time in order to search for a correlation peak. The receiver then uses the correlation peak information to estimate the leading edge of the correlation function. The leading edge should be approximately one chip time prior to the correlation peak. The receiver then either reduces bandwidth and/or increases integration time and then moves the chip code position to the corresponding estimated leading edge of the correlation function. The receiver then samples and stores the correlation result, moves the code position by a portion of a chip time, and measures additional correlation results. The correlation results can be in the form of signal strength indication, quieting detection, or lock detection from control loop means. The receiver then uses the sample to form a slope which more accurately predicts the leading edge of the correlation function. Alternatively, the receiver can use these samples to provide pointers to a look-up table which stores results yielding enhanced-accuracy time of arrival measurements.

Any one of a number of existing techniques available in the art can be used to determine the approximate location of a correlation peak. These include sliding correlators, serial search methods, and frequency or chip clock slewing, with or without conventional Costas loop or tau dither loop or delay lock loop hardware. In the instant invention, a correlation peak can be determined in either a minimum detectable signal (MDS) or a strong signal case. In the MDS case, a small signal increase above the noise floor may be detected indicating the presence of a correlation peak. The correlation peak can be used to estimate the leading edge of the correlation function. Alternatively, an intermediate step of increasing signal averaging or reducing bandwidth can enhance the correlation peak prior to making an estimation of the beginning point of the correlation function.

In the strong signal case, the correlation peak can be used to estimate the leading edge of the correlation function. Alternatively, slope information from the correlation peak can be taken from one or more readings taken a portion of a chip prior to the peak to estimate the correlation function leading edge. If two correlation peaks appeared due to the results of multipath, then the leading correlation peak can be used to estimate the leading edge of the correlation function. Alternatively, an average can be calculated between the two correlation peaks in order to estimate the leading edge of the correlation function.

The correlation peak is first sought as an indication because it represents the highest signal-to-noise ratio (SNR) feature of the received signal. As an alternative to using the peak, if stronger signals were available, then the leading edge correlation slope can be used directly or the entire correlation function envelope can be used to predict the leading edge of the correlation function.

Any of the above techniques can be used to estimate the leading edge of the correlation function. The more accurate this estimation, the shorter the dwell time required when taking additional samples of the leading edge of the correlation function. Less accurate initial measurements force a broader range of search to guarantee that the leading edge is included within the search. More accurate initial measurements allow the range of the search to be reduced. Reducing the range of the search is desirable so that the on-air time of the transmitted signal can be minimized. Minimizing the on-air time of the transmitted signal results in a high volume message traffic system by reducing message collisions.

In a high signal-to-noise ratio situation, the first leading edge data sample which exceeds the auto-correlation code noise plus anticipated background noise can be used as a first signal. To ensure that the signal-to-noise ratio of leading edge samples is equal to that of correlation peak samples, the receiver bandwidth is reduced or the baseband integration time is increased to compensate for the difference. This technique has the advantage of yielding similar accuracy readings in both the strong signal and the MDS cases. Typically, MDS cases are accepted as yielding inherently poor accuracy. The anticipated strength increase of the leading edge correlation function signal strength above the uncorrelated tails can be calculated as $$20 \log \left( \frac{N+1}{8} - 2 \right),$$

for the first 1/8 chip step search, where N=number of chips in the code. The improvement needed to equalize the strong signal in the MDS case is therefore $$20 \log (N) - 20 \log \left( \frac{N+1}{8} - 2 \right).$$

This ratio is provided by an associated reduction in bandwidth and/or increase in integration time. In the instant invention, this results in an increased integration time of 17 to 1.

Once the estimation of the correlation peak leading edge is calculated, and the signal to noise ratio increased, then additional samples can be taken to more accurately establish the leading edge of the correlation function.

One of several expanded SNR search schemes can be employed. First, a search scheme can be used which anticipates that the initial prediction of the leading edge of the correlation function purposely comes before the initial signal leading edge by one or more sub-chip step samples. In this case, the first sample taken should be at the auto-correlation function code noise floor. The chip code clock of the receiver can then be advanced in sub-chip multiples in order to produce a contour of signal strength improvement or quieting detector output improvement. These measurements are then stored for later processing.

Alternatively, the leading edge of the correlation function can be initially estimated in a manner to purposely force an initial measurement after the leading edge of the correlation function. In this case, the receiver's chip code clock should be decremented in sub-chip steps and measurements of signal strength or quieting detector output can be made which have decreasing strength until they stabilize at the auto-correlation function's code noise level.

A third approach is to produce an initial estimation in between these previous two schemes. This approach makes a best estimate of the exact beginning of the leading edge of the correlation function. Then, based on that estimated beginning signal strength, the receiver's code clock can be incremented or decremented in sub-chip multiples, depending upon whether the initial reading was at the auto-correlation function's code noise level or above that level. Alternatively, a form of a binary search based on signal strength could be used after an initial sample was taken.

If two or more such samples were taken, then this information can be used to create a slope vector. If three or more samples were used, then these samples can be weighted to produce a slope vector. This weighting can take into consideration that the leading samples have lower signal-to-noise ratio but lower multipath error, and that later samples have higher signal-to-noise ratio but higher multipath error. In the third alternative, three or more samples can be stored and then used as input to a look-up table which has been pre-assigned with best estimate results based on theoretically derived or empirical data.

When searching in a quantized step of a sub-chip multiple, time-of-arrival resolution is limited to ±½ of the quantized sub-chip step size. Combining signal strength and envelope information produces a vector with far greater resolution. However, the achievable accuracy is limited by signal-to-noise ratio and multipath environment. Lastly, the multiplicity of envelope samples can be transferred to a central processing hub which collects time-of-arrival information from multiple receivers. This information can be combined by the hub to further reduce errors and increase accuracy.

This technique is equally applicable to digital parallel correlators. Bandwidth can be reduced by weighting multiple correlation results or arranging multiple correlation readings, or by other techniques as are known in the art, in order to improve signal to noise ratio. Only a portion of the received signal need be analyzed at this slower information rate so that message traffic would not be greatly impacted. The sample clock of the parallel correlator can be shifted to one chip time leading the correlation peak. Then the sample clock can be shifted in 1/8 chip increments in a similar manner to the serial correlator's chip code position. This makes serial and parallel correlation techniques equivalent.

Figure 2:
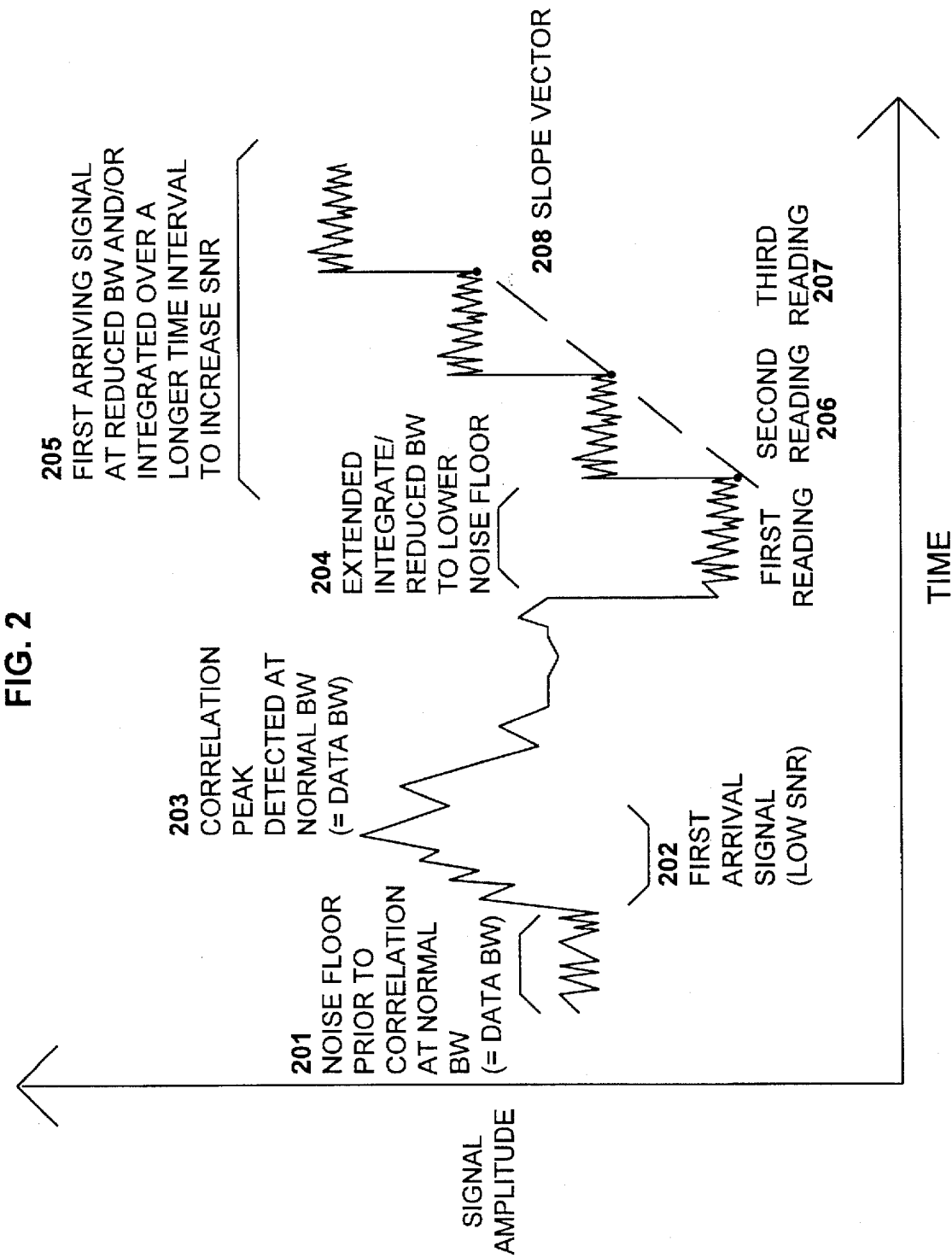
FIG. 2 shows received signal strength output of receiver.

FIG. 2 illustrates a graph of signal amplitude versus time of a received signal strength indicator output typical of the above techniques. The initial portion of the signal 201 depicts the noise floor or the auto-correlation function code noise being measured at a resolution bandwidth approximately equal to that of the data bandwidth. Such measurements can be made practically at up to three times the data rate bandwidth with a small sacrifice in SNR performance, but with the added advantage of decreased search time.

The next time portion of the illustration depicts the leading edge, first arriving signal 202. This is the signal which is least affected by multipath, but is at a lower signal-to-noise ratio than the signal peak.

The next portion of time indicates the correlation peak 203 detected at the normal sampling bandwidth, approximately that of the data.

The correlation peak, or correlation envelope, or some combination thereof, is used to estimate the leading edge of the correlation function. To ensure that the MDS case can yield an accuracy similar to the strong signal case, the detector bandwidth is decreased and the integration time is increased by an appropriate amount so that the leading edge of the correlation function can have a greater signal-to-noise ratio to produce an enhanced accuracy time-of-arrival reading. If the radio location system was simultaneously transmitting data during the time when synchronization was being acquired, then the transmitter data modulation bandwidth likewise is reduced to allow all of the received signal energy to be detected.

The next portion of time, depicted first reading 204, illustrates the noise floor being reduced, in the MDS case, by increasing the integration sample time and/or reducing the bandwidth prior to detection.

The next period of time, illustrated by first arriving signal 205, shows the expanded first arriving signal, which has been filtered and integrated over a longer time interval to increase the signal-to-noise ratio. Each of these samples is taken after the receiver's chip code clock has been shifted a portion of a chip time. In the instant invention the chip code clock is shifted in ⅛ chip steps. The second reading 206 is taken once the chip code clock has been shifted a portion of a chip time. The third reading 207 is taken after the second reading 206 is complete and after the chip code clock has been shifted an additional portion of a chip time. Two or more of these sample measurements are then used to predict a slope vector 208 or provide look-up table information to increase the resolution of the time-of-arrival measurement.

The information obtained at the leading edge of the correlation function is in two forms. The first form of information is determined by finding the position of the chip code position which experiences a signal strength increase above the noise floor, or above the auto-correlation noise. The other form of information is determined by noting the level of the increase in the signal strength from one sample to the next. If two samples were taken, then a simple vector can be calculated. If three or more samples were taken, then a form of curve fitting algorithm may be used, since multi-point slope measurements are not necessarily a straight linear function. As an alternative to calculating the leading edge of the correlation based on slope information, a look-up table can be used. Such a table can be a two-dimensional array or can be a look-up of a multiplicity of readings which will form an N-dimensional array, where N equals the number of readings taken as the chip code position is moved a portion of a chip time. The table entries can be derived by numeric estimation techniques. Alternatively, empirical data can be collected from actual field experience using known position transmitters and receivers. In this way, a first reading 301 and a second reading 302, as shown in FIG. 3, can be bound to the most likely correct result. Further, the look-up table can be one of several selectable look-up tables. If the operating environment of a the transmitter were known, such as in-building, in-urban areas, in-rural area, etc. then look-up table entries can be designed, and later selected, for best-fit in that environment.

FIG. 3 depicts a look-up table of signal increase over ambient noise versus sub-chip position signal strength. In the instant invention, a first reading 301 is taken in order to establish the ambient noise floor or the ambient auto-correlation noise floor. This step is not, however, essential to the invention. Once a reading is taken representative of the noise floor, this reading is used as a base line indication of signal improvement between the noise floor and the second reading 302, third reading 303, and any additional readings.

A second reading 302 is used as a look-up pointer in the table. A third reading 303 is used as a pointer into the table. A multiplicity of pointers from readings can be used to look up a specific table entry 304 which represents data that yields the most accurate result.

By using amplitude as well as fractional chip code position, resolutions can be achieved which are greater than the resulting fractional chip code position. This is due to the amplitude plus the fractional chip code positions resulting in a vector which has a resolution of: (number of chip code fractional positions)×(resolution of the amplitude of the sampled received signal strength indication).

Figure 4:
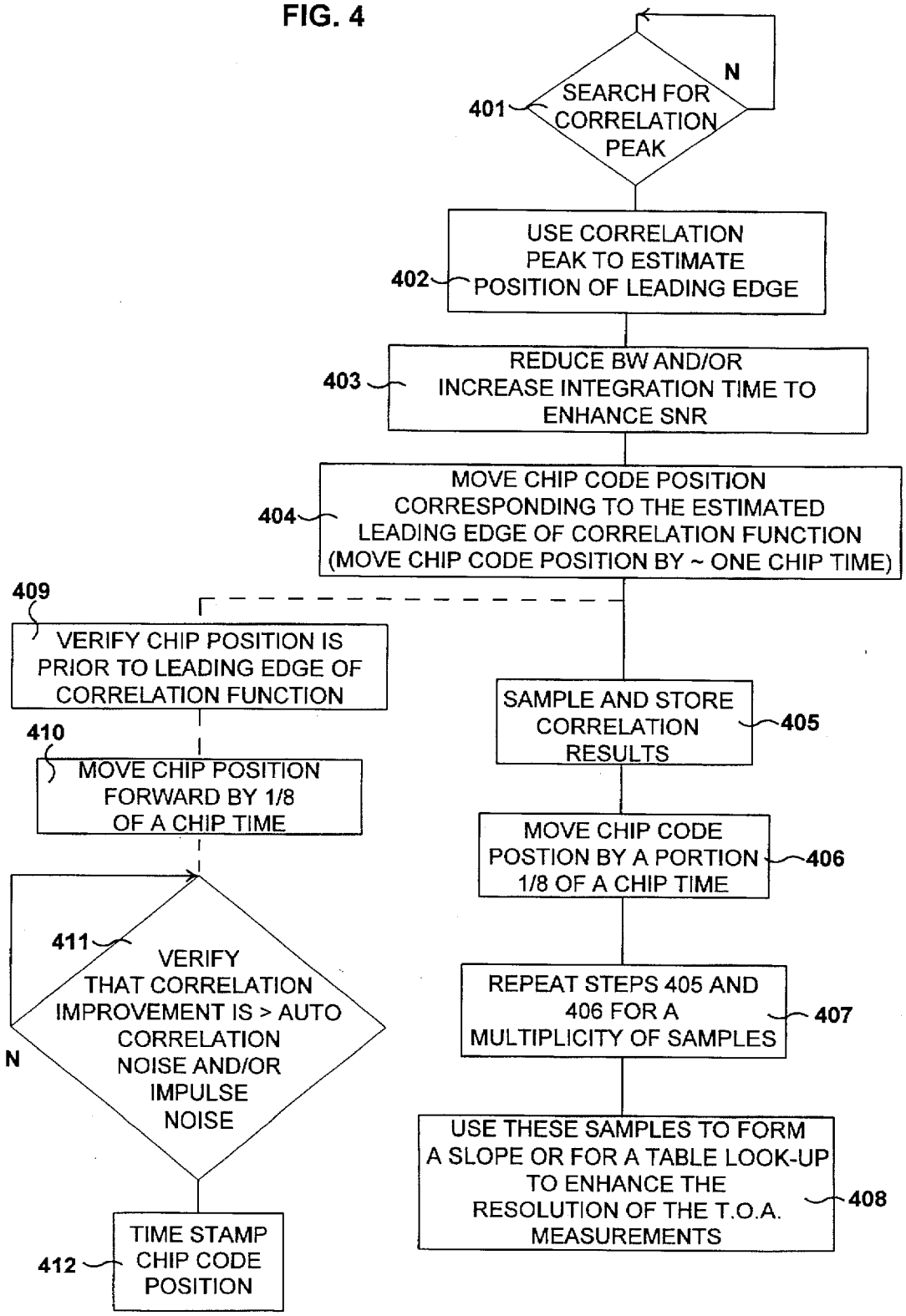
FIG. 4 illustrates a receiver algorithm.

FIG. 4 illustrates a receiver algorithm that can be applied in the present invention. The receiver searches 401 for a correlation peak by slewing the chip code clock, jogging the chip code clock in fractional increments, or by any equivalent means as is known in the art. The method searches 401 for a correlation peak. Once a correlation peak is established, the algorithm then uses the correlation peak to estimate 402 the time position of the leading edge of the correlation function. Next, the receiver reduces 403 the bandwidth and/or increases 403 the integration time to improve the signal-to-noise ratio at the leading edge of the correlation function. The receiver next moves 404 the chip code delay position to the corresponding estimation of the leading edge of the correlation function. The algorithm can additionally seek two similar amplitude readings in order to verify 409 that the chip position is aligned prior to the leading edge of the correlation function. This establishes the ambient noise floor or auto-correlation noise floor.

The receiver then samples and stores 405 the resulting correlation measurements. These correlation results can be stored 405 as representative improvements over ambient noise in signal strength, quieting detection output, and/or lock detection from any of the available closed loop means. Next the receiver moves 406 the chip code delay position by a portion of a chip time. In the instant invention, the receiver moves 406 the chip code forward by ⅛ of a chip time. The next step of the algorithm repeats 407 the steps of sampling and storing 405 and moving 406 the chip code delay position for a multiplicity of samples. Alternatively, the algorithm can suppress storage of correlation results until the improvement over ambient noise is greater than the anticipated noise spikes and/or cross-correlation of misaligned codes. This is typically 2 dB to 4 dB. Lastly, the algorithm uses the multiplicity of samples to form 408 either a slope, which predicts the leading edge of the correlation function, or a look-up table of "best fit" results which indicate the leading edge of the correlation function. Either of these two methods can enhance the resolution of the time of arrival measurements.

Alternatively, the steps of sampling and storing 405 and moving the chip code delay position 406 can be repeated for a multiplicity of samples whereby the chip code phase time/time position is alternately both advanced and delayed by a portion of a chip time. These additional readings can be averaged to provide greater noise filtering. The additional noise filtering reduces the error term generated by random noise which increases the effective signal-to-noise ratio and thereby the accuracy of the component of the signal representing time of arrival information.

As an alternative to an algorithm which uses slope or look-up table information to improve the resulting resolution and accuracy, the sub-chip position may also be used alone without amplitude information. Following step 404, the chip code position can first be verified 409 as being aligned prior to the leading edge of the correlation function. This can be accomplished by taking one or more readings which yield similar signal strength levels regardless of adjacent sub-chip code position. If the sub-chip code position were not aligned prior to the leading edge of the correlation function, then fractional realignments of the chip code position yield readings which increase and decrease relating to the slope of the correlation function.

Once the chip code position is verified 409 to be positioned prior to the leading edge of the correlation function, the chip code position is moved 410 forward in ⅛ chip increments. The chip position continues to be incremented in ⅛ chip increments until occurrence of a signal improvement is verified 411, which is greater than a preset margin or threshold. The preset margin can be set as a calculation of anticipated auto-correlation noise predicted from fractional chip step moves. In addition, anticipated random fluctuation and impulse noise, for the bandwidth and integration time searched, can be added to the preset margin. In this manner, a signal strength improvement which is greater than the preset margin stops the further advancement of sub-chip code search. Once this advancement is stopped, the chip code position can be time stamped 412 to provide a relative time-of-arrival reading with +/−1/16 of a chip time resolution.

As illustratively shown in FIG. 5, the received signal, after passing through a receiver front-end and optionally through a down conversion and appropriate filtering, as is well known in the art, is first applied to mixer 501. Mixer bandwidth compresses an incoming spread spectrum signal to output a compressed non-spread spectrum signal. Mixer 501 is injected on its local oscillator port either directly by chip code generator 503 or alternately by a mixer/local oscillator combination 502. The mixer/local oscillator 502 provides for the optional second or third down conversion of the received signal to yield lower IF frequencies, as is well known in the art. Alternatively, mixer 501 or mixer/local oscillator 502 can be driven by a chip code output filter 510. Filter 510 can be designed to provide a sharp roll-off of the wideband spread spectrum signal so that filter 510 matches a similarly compressed transmitted signal. The instant invention preferably uses a five pole elliptic filter to reduce bandwidth. Bandwidth compressed transmission has the advantage of using less spectrum and can therefore merit favorable FCC treatment.

A chip code generator 503 provides the spread-spectrum direct sequence modulation output. Appropriate chip code generators can be fashioned from an EXCLUSIVE-OR gate tapped shift register with feedback, or a RAM/ROM look-up table wherein the appropriate chip code pattern is stored, or a serial shift register wherein the appropriate chip code pattern is stored, or any other means, as is well known in the art. The instant invention uses a sequentially addressed ROM look-up table to store and recall the chip code pattern. The chip code generator 503 also several inputs. The inputs are designed to alter the time/delay offset of the repetitive chip code output. The advance input causes a time advance of the chip code position. The delay input causes a time delay of the chip code position. The advance and delay inputs can be in units of multiple chips, a single chip, or in units of a portion of a chip. In the instant invention, the advance and delay lines are selected in two chip, one chip, ¼ chip, or ⅛ chip increments. Further, the chip code generator 503 is equipped with an input/output port which allows the processor 509 to read and write the chip code alignment delay. The chip code delay/alignment position output port allows the processor 509 to determine the aggregate time/delay position offset which has been selected/optimized by the processor 509. When the processor 509 reads the chip code delay position from the chip code generator 503, the processor 509 is able to time stamp the delay/alignment position of an incoming received signal with a high degree of accuracy. The ability to read the chip code delay position allows the processor 509 to determine relative time-of-arrival measurements and to compare the chip code delay position to either a time reference or to another incoming received signal. The relative time-of-arrival information of the received signal can then be used to calculate a distance or a hyperbolic line of position.

In addition to reading the chip code delay position, the processor 509 can also set any chip code delay position by writing the input port of the chip code generator 503.

A bandpass filter 504 serves to eliminate received noise outside of the compressed output of the mixer 501 and sets the ultimate sensitivity of the receiver unless a phase-locked-loop (PLL) circuit is used in a detector 506. Alternatively, a reduced bandpass filter 505 can be selected by the processor 509, to enhance the signal-to-noise ratio of the received signal. The filtered signal from bandpass filter 504 or reduced bandpass filter 505 is provided to the detector 506 which makes possible a measurement of correlation. The detector 506 can be fashioned from available components which either measure signal strength or quieting detection or phase lock detection. The output of the detector 506 is integrated or filtered by filter 507 which is set to approximately the data bandwidth. Alternatively, the filtering or integration can be selected by the processor 509, to reduce higher frequency noise through the use of an alternative filter 508. The output of filter 507 or alternative filter 508 provides a measurement of correlation level to processor 509 so that the processor 509 can perform the enhanced time-of-arrival algorithm. The detector 506 can additionally provide part, or all, of the components necessary for data demodulation.

The processor 509 can be a micro-computer or digital logic, or discrete components, or an ASIC, or any equivalent means which can run the enhanced time-of-arrival algorithm. The instant invention uses a digital signal processor (DSP)/micro-processor with an internal analog to digital convertor to translate the correlation measurement input into a digital representation of correlation level. The DSP microprocessor in the instant invention further controls the advance and delay of the chip code phase position of the chip code generator 503 and reads the phase position of a received signal for time-of-flight, or relative time-of-flight, measurements.

It will be apparent to those skilled in the art that various modifications can be made to the enhanced time of arrival method of the instant invention without departing from the scope or spirit of the invention, and it is intended that the present invention cover modifications and variations of the enhanced time of arrival method provided they come within the scope of the appended claims and their equivalents.

I claim:

1. A method for improving accuracy of a radio location system based on time-of-arrival at a receiver using direct-sequence spread-spectrum modulation for time stamping a received radio broadcast, comprising the steps of:

determining a time position of a correlation peak of the received radio broadcast;

estimating from the correlation peak a leading edge of a correlation function;

collecting a multiplicity of correlation envelope samples of the leading edge of the correlation function, each of said multiplicity of correlation envelope samples separated by a portion of a chip time; and calculating slope information from the leading edge of the correlation function for increasing resolution and accuracy of a time-of-arrival reading.

2. The method as set forth in claim 1, further comprising the step of:

inputting said multiplicity of correlation envelope samples to a look-up table of best-fit results for increasing resolution and accuracy of a time-of-arrival reading.

3. The method as set forth in claim 1, further comprising, after the step of estimating, the step of:

reducing a bandwidth of the receiver for enhancing signal-to-noise ratio.

4. The method as set forth in claim 1, further comprising, after the step of estimating, the step of:

increasing an integration time for enhancing signal-to-noise ratio.

5. The method as set forth in claim 3 or 4, further comprising the step of:

inputting said multiplicity of correlation envelope samples to the look-up table of best-fit results.

6. A method for locating radio units based on time-of-arrival at a receiver using direct sequence spread spectrum to time stamp incoming radio broadcasts, the method comprising the steps of:

receiving a signal;

reducing a bandwidth of the receiver for enhancing signal-to-noise ratio;

measuring a leading edge of a correlation function;

comparing the leading edge to a level at least equaling a sum of an auto-correlation code noise and estimated background noise;

time stamping a first arriving signal, using the leading edge of the correlation function, responsive to the leading edge exceeding the sum; and remeasuring, responsive to the leading edge not exceeding the sum, a leading edge of the correlation function.

7. A method for locating radio units based on time-of-arrival at a receiver using direct sequence spread spectrum to time stamp incoming radio broadcasts, the method comprising the steps of:

receiving a signal;

measuring a leading edge of a correlation function;

comparing the leading edge to a level at least equaling a sum of an auto-correlation code noise and estimated background noise;

time stamping a first arriving signal, using the leading edge of the correlation function, responsive to the leading edge exceeding the sum;

remeasuring, responsive to the leading edge not exceeding the sum, a leading edge of the correlation function;

collecting a multiplicity of samples at the leading edge of the correlation function;

deriving slope information from the multiplicity of samples; and enhancing resolution, using the slope information, of a time-of-arrival time stamp.

8. A method for locating radio units based on time-of-arrival at a receiver using direct sequence spread spectrum to time stamp incoming radio broadcasts, the method comprising the steps of:

receiving a signal;

reducing a bandwidth of the receiver for enhancing signal-to-noise ratio;

measuring a leading edge of a correlation function;

comparing the leading edge to a level at least equaling a sum of an auto-correlation code noise and estimated background noise;

time stamping a first arriving signal, using the leading edge of the correlation function, responsive to the leading edge exceeding the sum;

remeasuring, responsive to the leading edge not exceeding the sum, a leading edge of the correlation function;

collecting a multiplicity of samples at the leading edge of the correlation function;

deriving slope information from the multiplicity of samples; and enhancing resolution, using the slope information, of a time-of-arrival time stamp.

9. The method as set forth in claim 7, further comprising, before the step of measuring a leading edge of a correlation function, the step of:

increasing integration time for enhancing signal to noise ratio.

10. The method as set forth in claim 6, further comprising the steps of:

collecting a multiplicity of samples at the leading edge of the correlation function; and inputting the multiplicity of samples to a look-up table of best-fit results for increasing resolution of a time-of-arrival reading.

11. The method as set forth in claim 7, further comprising the step of:

reducing a bandwidth by an amount to provide a leading edge correlation function reading signal-to-noise ratio approximately that of a non-bandwidth-reduced correlation peak.

12. A method for locating radio units based on time-of-arrival at a receiver using direct sequence spread spectrum to time stamp incoming radio broadcasts, the method comprising the steps of:

receiving a signal;

estimating a leading edge of a correlation function from an aspect of the correlation function; and realigning a chip code temporal position to the leading edge of the correlation function; and time stamping a first arriving signal using at least one sample from the estimated leading edge of the correlation function.

13. The method as set forth in claim 12, further comprising, after the step of estimating a leading edge of a correlation function, the steps of:

comparing the leading edge to a level at least equaling a sum of an auto-correlation code noise and estimated background noise; and time stamping a first arriving signal, using the leading edge of the correlation function, responsive to the leading edge exceeding the sum; and re-estimating, responsive to the leading edge not exceeding the sum, a leading edge of the correlation function.

14. The method as set forth in claim 12, further comprising, before the step of estimating a leading edge of a correlation function, the step of:

reducing a bandwidth of the receiver for enhancing signal-to-noise ratio.

15. The method as set forth in claim 12, further comprising the steps of:

collecting a multiplicity of samples at the leading edge of the correlation function; and deriving slope information from the multiplicity of samples for enhancing resolution of a time-of-arrival time stamp.

16. The method as set forth in claim 12, further comprising, before the step of estimating a leading edge of a correlation function, the step of:

increasing integration time for enhancing signal to noise ratio.

17. The method as set forth in claim 12, further comprising the steps of:

collecting a multiplicity of samples at the leading edge of the correlation function; and inputting the multiplicity of samples to a look-up table of best-fit results for increasing resolution of a time-of-arrival reading.

18. The method as set forth in claim 12, further comprising the step of:

reducing a bandwidth by an amount to provide a leading edge correlation function reading signal-to-noise ratio approximately that of a non-bandwidth-reduced correlation peak.

19. A method for improving accuracy of a radio location system based on time-of-arrival at a receiver using direct sequence spread spectrum to time stamp a received radio broadcast, the method comprising the steps of:

receiving a signal;

determining a time position of a correlation peak;

estimating, using the correlation peak, a leading edge of a correlation function;

moving a chip code position backward by at least one chip time;

moving the chip code position forward by sub-chip increments until at least one of a correlation envelope reading exceeds a preset margin and a preset number of samples are taken; and time stamping the chip code position to represent a time-of-arrival of the signal.

20. The method as set forth in claim 19, further comprising the step of:

calculating slope information from the leading edge of the correlation function to increase resolution and accuracy of a time-of-arrival reading.

21. The method as set forth in claim 19, further comprising, after the step of determining a time position of a correlation peak, at least one of reducing a bandwidth of the receiver and increasing an integration time to enhance the signal to noise ratio.

22. A method for improving accuracy of a radio location system based on time-of-arrival at a receiver using direct sequence spread spectrum to time stamp the received radio broadcast, the method comprising the steps of:

receiving a signal;

determining a time position of a correlation peak;

estimating, using the correlation peak, a leading edge of a correlation function;

moving a chip code position backward by approximately one chip time;

enhancing signal-to-noise ratio by at least one of reducing a bandwidth of the receiver and increasing an integration time;

moving the chip code position, at least one of forward and backward, by sub-chip multiples, for verifying the chip code position occurs prior to the leading edge of the correlation function;

moving the chip position forward by sub-chip increments until at least one of a correlation envelope reading exceeds a preset margin and a preset number of samples are taken; and time stamping the chip code position to represent time-of-arrival of the signal.

23. The method as set forth in claim 22, further comprising the step of:

calculating slope information from the leading edge of the correlation function for increasing resolution and accuracy of a time-of-arrival reading.

24. A method for improving accuracy of a radio location system based on time-of-arrival using direct sequence spread spectrum to time stamp a signal received as a radio broadcast, the method comprising the steps of:

determining a time position of a correlation peak;

estimating, using the correlation peak, a leading edge of a correlation function;

moving a chip code position backward by less than one chip time;

moving the chip code position backward by sub-chip increments until a correlation envelope decreases by at least one of a preset margin and an auto-correlation noise floor; and time stamping the chip code position to represent time-of-arrival of the signal.

25. The method as set forth in claim 19, 22 or 24, further comprising after the step of moving a chip code position backward, the steps of:

moving the chip code position at least one of forward and backward;

measuring a resulting change in at least one of signal strength, quieting output, and lock detect, as a first reading;

moving the chip code position by at least one of forward and backward;

measuring a resulting change in at least one of signal strength, quieting output, and lock detect, as a second reading; and using the first reading and the second reading as table pointers, to a result in a look-up table of best-fit results providing a best-fit time-of-arrival.

26. The method as set forth in claim 25, further comprising the steps of:

transferring the first reading and at least one of a multiplicity of second reading to a central processing hub; and combining, at the central processing hub, the first reading and at least one of the multiplicity of second readings with readings from other receivers for increasing accuracy in time-of-arrival readings.

27. A method for improving a radio location system based on time-of-arrival, using spread spectrum to time stamp a received radio broadcast, the method comprising the steps of:

receiving a signal;

determining a time position of a correlation peak;

estimating, using the correlation peak, a leading edge of a correlation function;

moving a chip code position backwards by less than one chip time;

moving the chip code position at least one of forward and backward;

measuring a resulting change in at least one of signal strength, quieting output, and lock detect, as a first reading;

moving the chip code position by at least one of forward and backward;

measuring a resulting change in at least one of signal strength, quieting output, and lock detect, as a second reading; and calculating, using the first reading and the second reading, a slope for increasing the resolution of a time-of-flight radio location system.

28. The method as set forth in claim 27, further comprising the step of:

using the first reading and the second reading as table pointers, to a result in a look-up table of best-fit results providing a best-fit time-of-arrival.

29. The method as set forth in claim 27, further comprising the steps of:

transferring the first reading and at least one of a multiplicity of second readings to a central processing hub; and combining, at the central processing hub, the first reading and at least one of the multiplicity of second readings with readings from other receivers for increasing accuracy in time-of-arrival readings.

30. The method as set forth in claim 24 or 27, further comprising, after the step of determining a time position of a correlation peak, the step of reducing bandwidth to enhance signal-to-noise ratio.

31. The method as set forth in claims 1, 6 or 12, further comprising the steps of:

taking a first reading of the leading edge of the correlation function;

taking a multiplicity of second readings of the leading edge of the correlation function;

transferring the first reading and at least one of the multiplicity of second readings to a central processing hub; and combining, at the central processing hub, the first reading and at least one of the multiplicity of second readings with readings from other receivers for increasing accuracy in time-of-arrival readings.

32. A method for improving a radio location system based on time-of-arrival using direct sequence spread spectrum to time stamp the received radio broadcast, the method comprising the steps of:

receiving a signal;

determining a time position of a correlation peak;

estimating, using the correlation peak, a leading edge of a correlation function;

moving a chip code position backward by at least one chip time from the correlation peak;

moving the chip code position forward by a portion of a chip time; and time stamping, responsive to a correlation envelope exceeding a preset margin, the chip code position representative of a time-of-arrival of the signal.

33. The method as set forth in claim 32, further comprising the steps of:

collecting a multiplicity of readings; and calculating, using the multiplicity of readings, slope information for increasing resolution and accuracy of a time-of-arrival reading.

34. The method as set forth in claim 32, further comprising, after the step of determining a time position of a correlation peak, the step of reducing bandwidth to enhance signal-to-noise ratio.

35. The method as set forth in claim 24, 27 or 32, further comprising, after the step of determining a time position of a correlation peak, the step of increasing filtering to enhance signal-to-noise ratio.

36. The method as set forth in claim 2, 10, 17 or 28, further comprising the step of selecting a look-up table of best-fit results from a plurality of look-up tables, depending on a particular operating environment of a transmitter, for improving fit in the particular operating environment.

37. The method as set forth in claim 1, 6, 12, 19, 22, 24, 27 or 32, further comprising the steps of:

forwarding a sub-chip position and a signal strength as a raw data reading to a central processing hub; and combining, at the central processing hub, the raw data reading with a plurality of raw data readings from other receivers to increase accuracy of a time-of-arrival radio location system.

38. The method as set forth in claim 3, 6, 8, 11, 14, 18 or 34, wherein bandwidth is reduced for only a limited sampling time, with said limited sampling time less than an entire transmit/receive duration.

39. The method as set forth in claim 6, 8, 12, 19, 22, 24, 27 or 32, further comprising the steps of:

sampling a first sub-chip code position and a first corresponding amplitude of the signal as a first sample;

sampling a second sub-chip code position and a second corresponding amplitude of the signal as a second sample; and calculating a slope vector using the first sample and the second sample.

40. The method as set forth in claim 39 further including the steps of:

sampling an $n^{th}$ sub-chip code position and an $n^{th}$ corresponding amplitude of the signal as an $n^{th}$ sample;

weighting the first sample, the second sample, and the $n^{th}$ sample for maximizing signal-to-noise ratio; and calculating a slope vector using at least two of the first sample, the second sample, and the $n^{th}$ sample.

41. The method as set forth in claim 39 further including the steps of:

sampling an $n^{th}$ sub-chip code position and an $n^{th}$ corresponding amplitude of the signal as an $n^{th}$ sample;

weighting the first sample, the second sample, and the $n^{th}$ sample for minimizing multipath error; and calculating a slope vector using at least two of the first sample, the second sample, and the $n^{th}$ sample.

* * * * *